United States Patent [19]
Franklin

[11] Patent Number: 5,837,926
[45] Date of Patent: Nov. 17, 1998

[54] MINES HAVING TUNED PASSIVE ELECTROMAGNETIC REFLECTORS TO ENHANCE RADAR DETECTION

[75] Inventor: Donald E. Franklin, Springfield, Va.

[73] Assignee: United States of America as represented by the Secretary of the Army, Washington, D.C.

[21] Appl. No.: 689,215

[22] Filed: Aug. 7, 1996

[51] Int. Cl.[6] .................................................. F42C 22/02
[52] U.S. Cl. ........................................................ 102/427
[58] Field of Search .................................. 102/401, 427, 102/211, 214; 342/61, 68, 22; 89/1.11

[56] References Cited

U.S. PATENT DOCUMENTS

| | | | |
|---|---|---|---|
| 3,754,508 | 8/1973 | Dalton | 102/427 |
| 4,022,128 | 5/1977 | Watson | 102/401 |
| 4,712,479 | 12/1987 | Babel | 102/427 |
| 4,719,426 | 1/1988 | Weiss | 324/345 |
| 4,848,236 | 7/1989 | Hembise | 102/427 |
| 5,027,709 | 7/1991 | Slagle | 102/427 |
| 5,206,653 | 4/1993 | Westphal | 102/427 |
| 5,489,909 | 2/1996 | Dittmann et al. | 102/427 |
| 5,592,170 | 1/1997 | Price et al. | 342/22 |
| 5,598,152 | 1/1997 | Scarzello et al. | 342/22 |
| 5,680,048 | 10/1997 | Wollny | 342/22 |

FOREIGN PATENT DOCUMENTS 2227081  7/1990  United Kingdom ................... 102/401

*Primary Examiner*—Charles T. Jordan
*Assistant Examiner*—Theresa M. Wesson
*Attorney, Agent, or Firm*—Milton W. Lee; John E. Holford; Alain L. Bashore

[57] ABSTRACT

Metal structures that are resonant to electromagnetic waves are combined with land mines to make them easier to detect using Ground Penetrating Radar. Knowledge of the resonant characteristics in the metal structures enhances detection and identification.

20 Claims, 3 Drawing Sheets

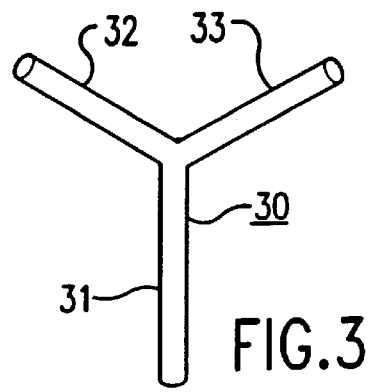
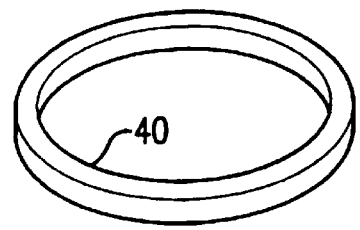
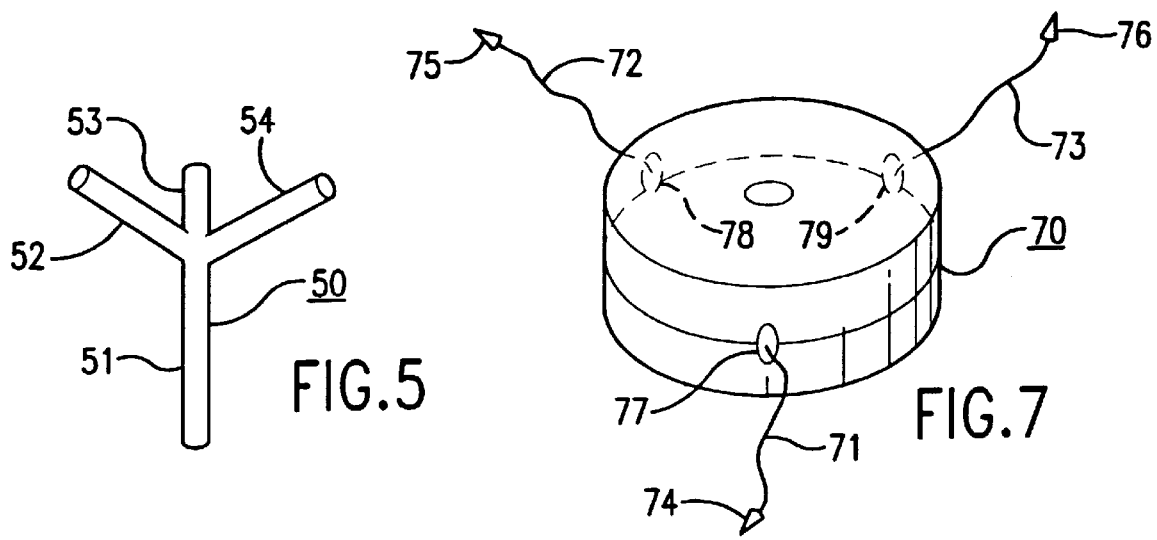
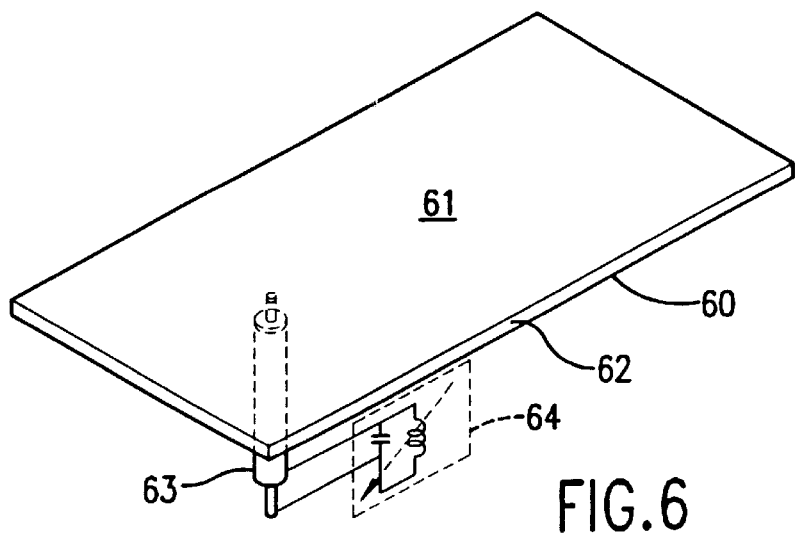

MINES HAVING TUNED PASSIVE ELECTROMAGNETIC REFLECTORS TO ENHANCE RADAR DETECTION

BACKGROUND OF THE INVENTION

1. Field of the Invention

The present invention generally relates to means and methods of locating anti-personnel and antitank mines.

2. Description of Prior Art

There is a growing problem in many parts of the world concerning the removal of land mines. These weapons are a relatively cheap and effective form of defense. As a result they have been implanted manually or scattered over wide areas from land or air vehicles. Some mines use metal shells and efforts have been made to locate them with GPR [Ground Penetrating Radar]. There are also a large number of essentially non-metal mines. One particularly common type, encased in plastic containers, are known as plastic mines. In spite of active research programs since 1940, it is impossible to reliably detect and identify buried mines. There is a particular problem with plastic mines in dry sandy soils. The electrical properties of the mine can be nearly the same as the soil. Also the sand is continually being shifted by wind and rain, so that the mine may migrate far from its original position. The presence of these mines not only renders the land unusable, but poses a continual danger to unwary travelers, souvenir seekers and most tragically to inquisitive children. There is, therefore, a need to redesign both anti-personnel (A-P) and antitank (A-T) mines so that they can be quickly and safely detected for removal at least by the deployer, when no longer needed. To be acceptable to all deployers, however, the redesign must not compromise the position or function of the mine while in use. An object of the present invention is to provide mines with designs that meet the above criteria.

SUMMARY OF THE INVENTION

A mine is provided with one or more electromagnetic resonating structures, such as short-circuited dipole antennas to enhance its spectral response to electromagnetic waves impinging thereon. The structure of the emplaced mine can then be determined safely and reliably by exposing it to electromagnetic radiation within a preselected spectrum and identifying the reflected spectral response.

BRIEF DESCRIPTION OF THE DRAWINGS

The foregoing and other objects, aspects and advantages will be better understood from the following detailed description of a preferred embodiment of the invention with reference to the drawings, in which:

FIG. 3 shows a two dimensional Y-shaped short-circuited "tripole" antenna structure that can be substituted for the short-circuited dipoles shown in FIGS. 1 and 2;

FIG. 4 shows a two dimensional ring-shaped shorted loop structure that can be substituted for the short-circuited dipoles shown in FIGS. 1 and 2;

FIG. 5 shows a three dimensional antenna structure, known as a quadripod, that can be substituted for the dipoles shown in FIGS. 1 and 2;

FIG. 6 shows a patch antenna, that can be substituted for the dipoles shown in FIGS. 1 and 2; and FIG. 7 shows a metal or plastic mine equipped with one or more short-circuited dipole resonators in the form of slim string-like wires attached to the surface of the mine.

DETAILED DESCRIPTION OF A PREFERRED EMBODIMENT OF THE INVENTION

Figure 1:
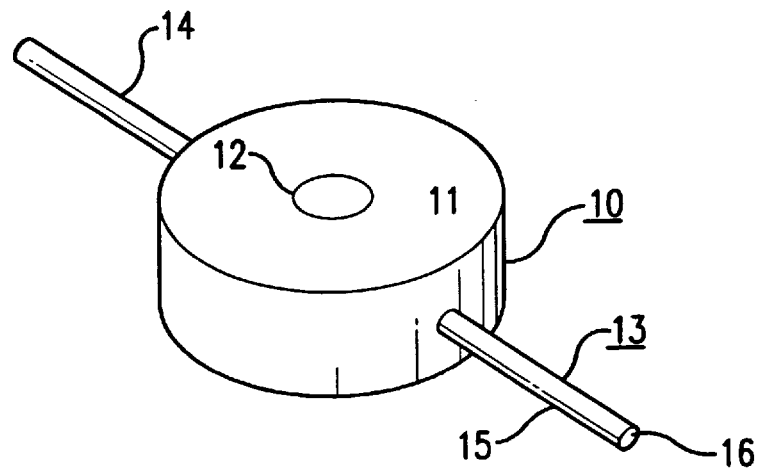
FIG. 1 shows a metal mine equipped with a dipole antenna connected to and short-circuited by the metal shell of a mine.

Referring now to the drawings, and more particularly to FIG. 1, there is shown a typical metallic explosive mine 10. The metal shell 11 that houses an explosive that may be, for example, disk shaped and have a small detonator or fuze 12 that triggers the explosive in response to pressure, magnetic influence or other properties of the intended target. Depending on the type of soil and the terrain these mines may be manually buried or scattered from land vehicles and aircraft. Their color and texture may permit them to blend in with the terrain where plant life, wind and rain further obscure them. If they are too conspicuous they may be buried or shaped to penetrate the ground when dropped from aircraft. As a rule operative anti-personnel mines are located on the surface or up to a few inches below it. Anti-tank mines are usually not planted deeper than a foot to obtain full effectiveness. A generic name for these mines is "land mine", although many are designed to operate underwater as well. While they are effective military weapons, they have long lives and usually remain a life threatening problem long after their military usefulness has terminated.

According to the present invention, this type of mine is converted into a device that is more easily detected, using Ground Penetrating Radar (GPR), and thus can be neutralized or removed when no longer needed. The metal shell 11 which contains the explosive and a detonator also supports one or more shorted metal dipole reflectors, such as the collinear dipoles 13 and 14. Since the case is metal and contacts one end of each dipole, the case and dipoles cooperate to form a very long metal cylinder. The detection and identification of finite length metal cylinders buried at reasonable depths has been achievable for several decades via Ground Penetrating Radar (GPR), see L. C. Chan, D. L. Moffatt and L. Peters, Jr., "A Characterization of Subsurface Radar Target," Proc. IEEE, 67, pp. 991–1001, July 1979. Also see L. C. Chan, L. Peters, Jr. and D. L. Moffatt, "Improved Performance of a Subsurface Radar Target Identification System through Antenna Design," IEEE Trans. on Antennas and Propagat., AP-29, pp. 307–312, 1981. At present GPR represents the most successful means of identifying and detecting unexploded Ordnance (UXO's), see P. K. Hayes, "Electromagnetic Behavior of Transmission Lines and Resonant Wires Very Near a Lossy Dielectric Interface," The Ohio State University Electro-Science Laboratory, Final Report 713768-2, December 1983.

The finite length conducting metal cylinder can be regarded as a short-circuited dipole antenna. Such antennas, when placed in the path of radiation from a GPR, unlike conventional dipole antennas terminated in their characteristic impedance that strongly absorb their characteristic frequency, strongly reflect these characteristic frequencies of radiation back toward its source. These frequencies are a function of the material, electrical and geometrical properties associated with the antennas. Electromagnetic radiation at wavelengths no greater than a few meters penetrates conductors only to the skin depth $\delta = 10^{-4}$ cm or less. Thus the shorted dipoles are best formed as fine wires or hollow tubes of highly conductive metal, which in fact may be a plating 15 on a tube or rod 16 of less conductive or non-conductive material. The dipoles can also be attached by means of a conductive epoxy, solder or the metal shell can simply include brackets or other protuberances with apertures to receive the dipoles. This arrangement is always suitable for manual placement or burial with sufficiently strong and well bonded flexible dipoles. The sophisticated equipment necessary to detect and identify the proposed mines, will not be generally available to an enemy on the front line and thus the mines will not be readily detected during battle. This invention is appropriate for metal encased mines as well as the nearly all plastic versions. While the metal mines are detectable via metal detectors, they cannot be distinguished from all of the inevitable shrapnel and discarded materials in the battlefield. The addition of the antenna (or wire) adds the identification capability using it in conjunction with GPR detection. The resonances of cylinders has been used to determine the lengths of various buried UXO's to depths of 5 feet in sand. The actual targets were not known for some experiments and were only revealed to the ElectroScience Laboratory after their results were published. The correlation of experimental and actual lengths was very high, see L. Peters, Jr., C-C. Chen and J. D. Young, "Final Report on Use of Ground Penetrating Radar (GPR) for Detection of Unexploded Ordnance," The Ohio State University ElectroScience Laboratory, Final Report 727388-7, February 1995. Also see L. Peters, J. D. Young, C-C. Chen and F. Paynter, "Final Report - Subsurface Ordnance Characterization System (SOCS), The Ohio State University Electro-Science Laboratory, Final Report 730001-1, May 1995.

The length of a cylinder and the medium surrounding it dictates the cylinder's dominant resonant frequency. In practice, the length can be adjusted to distinguish between various mine types. The fundamental or lowest resonant wavelength of the cylinder is approximately twice its length. It is important to note that the wire need not be absolutely straight. Studies of chaff elements demonstrated that they could be curved to almost a single turn helix before they lose their resonant properties. Such chaff is in essence a half wavelength long shorted dipole antenna at resonance which is used to confuse enemy radar. The cylinder is also the simplest and most practical chaff element.

Figure 2B:
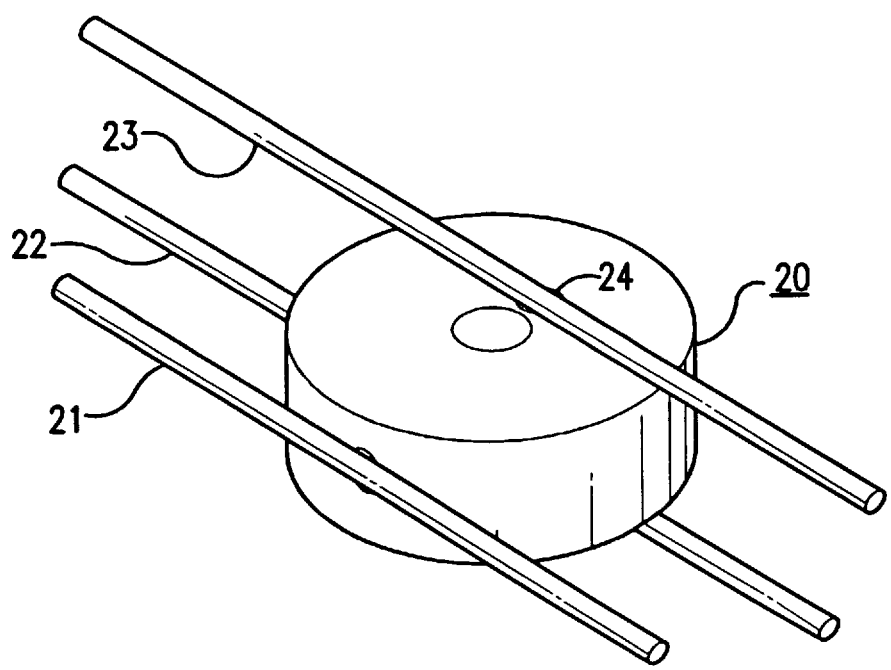
FIG. 2 shows a mine that may have either a metal or plastic shell equipped with short-circuited dipole antennas connected to the shell.

As shown in FIG. 2, a similar arrangement can be applied to a plastic or metal mine 20. The short-circuited dipoles are single rods or cylinders, like the short-circuited dipoles 21, 22 and 23, and are arranged in parallel to define a reflector set. The presence of a number of dipoles of the same length to reflect the same wavelength, rather than just one, increases the chance of receiving a satisfactory response. If some of the dipoles in a set have different lengths to reflect different wavelengths, as shown in this figure, the set can have an even more unique spectral response that may be detected by a GPR and can act as an identifying characteristic of one particular mine, e.g. anti-personnel, antitank, nth in a series, etc.

Figure 2A:
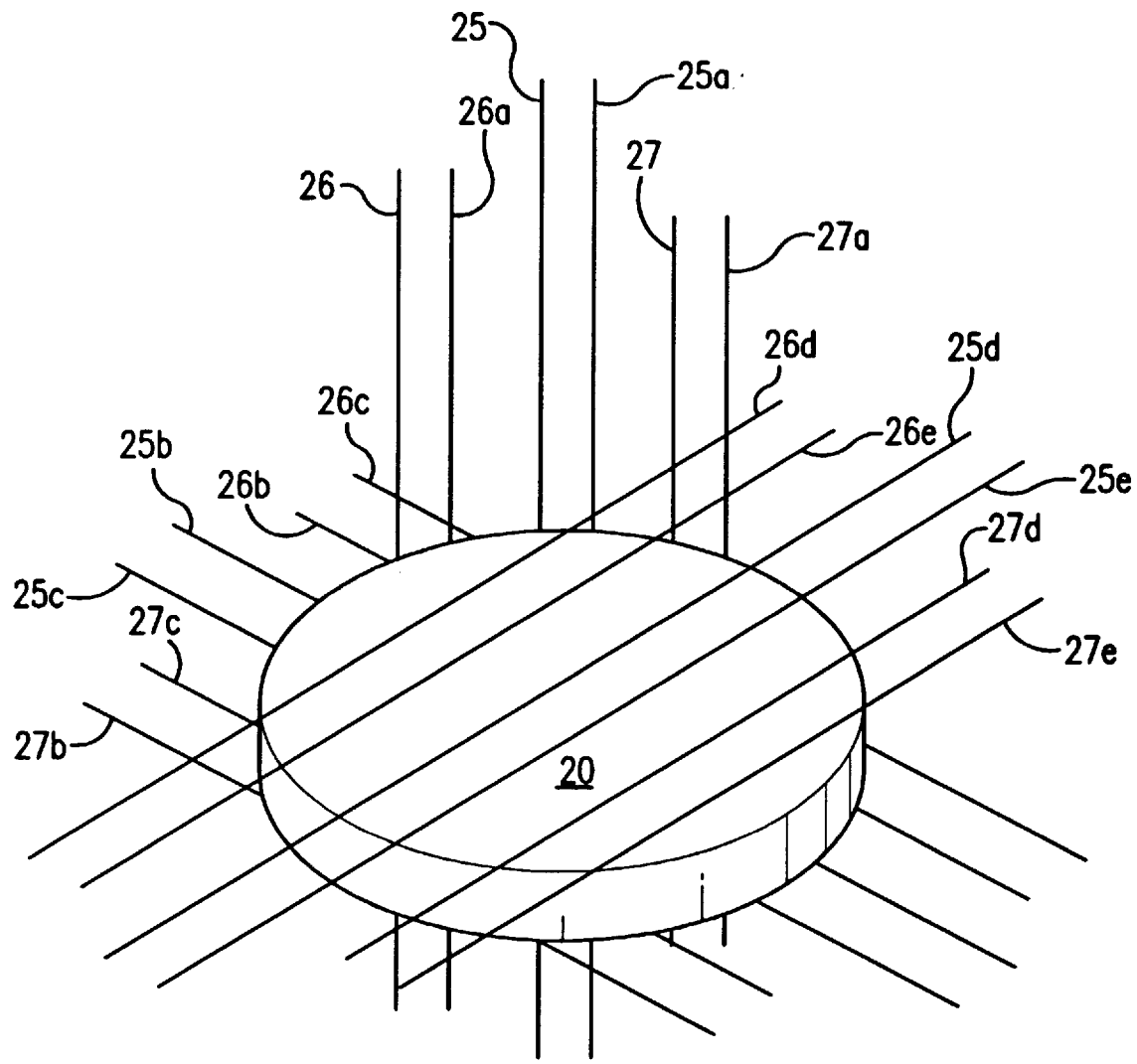

As shown in FIG. 2a, the simple plane polarized set of short-circuited reflecting dipoles on the mine 20 in FIG. 2 can be enhanced with extra dipoles that may be described as subsets and suprasets. Each subset is represented here by a pair of dipoles 25–25a, 25b–25c, 25d–25e, 26–26a, etc., but in general each may contain any number of dipoles of the same length. Such a subset is provided for each detection wavelength used in the RF signature desired for the mine, e.g. one for each of the individual dipoles in the set of FIG. 2, in what can be termed a supraset. Two or three of these suprasets are mounted on opposite sides and/or along the edge of the mine 20, each orthogonal to the others. This causes the total mine reflection to be independent of the polarization of the radar source. The more dipoles used in each subgroup, the greater will be the magnitude of the reflection of the subgroup characteristic frequency and the less will be the effect of damage to one dipole. Two subsets representing the same wavelength orthogonally oriented to one another form a cross-polarized reflector, they need not be coplanar. Three subsets similarly oriented provide an omnidiectional reflector, which always redirects incident energy toward the source. Theoretically any length dipole can be used, but in practice all of the RF wavelengths have been assigned to narrow bands or spectrums to reduce interference between RF sources and their receivers. This still permits hundreds of separately detectable subset dipole lengths for any given radar wavelength spectrum.

As shown in FIGS. 3 and 4, other polar arrangements of the antennas can be used, such as the dipoles in different reflector sets may intersect and such dipoles can be bonded into a single resonator, like the Y-shaped resonator 30. This resonator includes three axially coplanar arms or cylinders 31–33 preferably, but not necessarily, of equal length and joined at one end with equal angular separation. When the plane of its cylindrical axes is oriented parallel to the earth's surface, it is equally sensitive to the same radiation from equidistant points anywhere on that surface. Other coplaner shapes; such as cross-polarized short-circuited dipole antennas or crosses, squares, triangles or the shorted toroidal or ring-shaped loop antenna 40, shown in FIG. 4; also have this same azimuthal independence in response. The short-circuited dipoles may be slightly bent and glued, soldered or welded at their intersections, without changing their resonant characteristics significantly. When bent into a circle without its ends not touching a short circuited dipole becomes an open circuited version of the loop in FIG. 4.

FIG. 5 shows a three dimensional resonator or antenna 50 formed of four poles 51–54 and which is called a quadripod. The poles or arms are joined at one end and are oriented so that the angle between any two arms is equal to the angle between any other two arms, i.e. 105°. This structure exhibits substantially equal resonance to radiation from any direction, and thus is the three dimensional equivalent of the two dimensional Y-shaped resonator, discussed above.

A thorough study of the interaction between radar and wire elements has been carried out previously with application to chaff. Studies have included straight linear wires, a wire in the form of a single turn helix, loops, Y and quadripod shapes. These all have the desired strong resonances see J. H. Richmond, L. Schwab, R. G. Wickliff, Jr., "Scattering Characteristics of Some Thin Wire Elements," The Ohio State University ElectroScience Laboratory, Report 2584-8, February 1970. Also see R. H. Turpin, "Numerical Techniques for the Determination of Characteristic Modes and Their Application to Chaff Elements" The Ohio State University ElectroScience Laboratory, Report 2584-5, July 1969. It is observed that the straight wire is a good radar scattering model for a UXO and thus GPR's used to detect and identify UXO's would also be applicable to detecting mines with such a wire attached, i.e., said mine with an attached wire would look like a UXO to the GPR. It is likely in many tactical situations that mines and UXO would be located in the same area. Thus there would be an advantage to making the mine and UXO detectable by the same GPR. These wires need not be absolutely straight. It is demonstrated in the report by R. J. Garbacz and R. G. Wickliff, Jr., "Introduction to Characteristic Modes for Chaff Applications," The Ohio State University ElectroScience Laboratory, Report 2584-6, April 1970; that there is little loss in resonance behavior if the wires are curved. Some curved elements would have a relatively weak cross polarized scatter but offer the advantage that their backscatter return at normal incident would be nearly polarization independent and all have a strong resonant behavior.

FIG. 6 shows yet another form of antenna that could be used in conjunction with either metallic or plastic encased mines. This structure, called a patch antenna, comes from the microstrip antenna technology. This antenna includes a metal ground plane 60 over which is suspended a metal radiating patch 61. The space between these two metal elements is filled with a very thin strip of dielectric material 62 with a high dielectric constant and a very low loss coefficient for microwaves. The size and shape of the patch (or patches) determines the frequency and directivity of the antenna. These antennas are available in tape form with an adhesive coating protected by a release layer, which is removed before attaching the antenna to any suitable surface. See U.S. Pat. No. 5,155,494; "TAPE TYPE MICROSTRIP PATCH ANTENNA"; Granted October 13, 1992; to Michael H. Thursby, et al. The patch elements are available, for example, in configurations that produce linear or circular polarization for frequencies in the radar bands where GPR operates. See U.S. Pat. No. 5,241,321 "DUAL FREQUENCY CIRCULARLY POLARIZED MICROWAVE ANTENNA" granted Aug. 31, 1993. While these antenna elements are designed primarily for use with microstrip components, which include microstrip transmission lines and tunable terminating load elements, they are also impedance matched to connect with commercially available coaxial cable. A strip line or cable 63, after being electrically attached to the antenna, can be terminated by a resonant element 64 to adjust the resonant frequency. In this structure, the dielectric layer under the metal patch essentially defines a resonant cavity, so that the feed structure elements 63 and 64 can be omitted, leaving only the dielectric layer and the metal antenna patch over a metal ground plane. It can be considered to be an antenna connected to a section of strip line terminated by an open circuit reactive load. It has the advantage of being even more narrow banded, i.e. electrically a high Q circuit, than the cylinder. The arrangement of this antenna is very compact so it does not protrude beyond the edges of the mine casing. It further can be customized to produce unique multiple resonances, which would further enhance identification.

FIG. 7 shows another approach wherein a mine 70 may have any number of poles or short-circuited dipoles formed of wires, like wires 71–73, that are attached at a first end to the surface of the mine. If desired, the second or free end of these wires may be attached to anchors 74–76. These anchors may consist of pegs or weights or both. The wires may thus be stretched linearly parallel to the ground to define equiangular radial antenna arms. The wires can also be deployed randomly, although this may make the frequencies somewhat uncertain and create minor variations in scattered radiation as a function of solid angle. The wires can be separately packaged or wrapped around the mine for storage or transport. Also, for convenience, pods 77–79 may be provided in which to store the wires prior to deployment. Each pod may also contain a reel on which to store the wire and a return spring connected between each reel and its case. These springs can provide tension on the deployed wires to aid in setting the desired length accurately, if different from the length provided by fully extending the wires. For special instances, the wires may include graduations to aid in setting different lengths or this could be done simply with a ruler. The mine ends of the wires can be brazed, soldered or glued to the mine directly or to a circumferential band around the mine. The band can be metal or non-metal and may stretch to fit the shell of the mine. On plastic mines a metal band can serve as part of the antennas electrical structure to form a larger polar structure.

The general procedure prescribed by the present invention for utilizing land mines; thus comprises the steps of:

(A) attaching at least one metallic electromagnetic resonator to said mine, which is tuned to a first frequency in a spectrum assigned to radar wavelengths; i.e. those used for GPR;

(B) emplacing the mine and resonator no more than a few feet below the surface of the soil or sand;

(C) locating said mine, when no longer needed, using a Ground Penetrating Radar receptive to the above first frequency;

(D) marking the position of the mine with an identification device; and (E) neutralizing the mine for its intended purpose; i.e. placing a warning sign over it, removing it or destroying it.

Having thus described my invention, what I claim as new and desire to secure by Letters Patent is as follows:

1. A mine formed of explosive material surrounded by a case that is not resonant to electromagnetic waves with wavelengths within a given spectrum, further comprising:

a first reflector set including at least a first resonant conducting structure tuned to reflect substantially all electromagnetic energy incident thereon at a first frequency within said spectrum and attached to said case.

2. A mine according to claim 1; wherein:

a second reflector set identical to said first set attached to said case so that the polarizations reflected from said first and second sets are mutually perpendicular.

3. A mine according to claim 2; wherein:

a third reflector set identical to said first and second sets attached to said case so that the polarizations reflected from said first, second and third sets are mutually perpendicular.

4. A mine according to claim 1; wherein said first set further includes:

more than one such resonant conducting structure attached to said case, each said structure reflecting the same wavelength within said spectrum.

5. A mine according to claim 1; wherein said first set further includes:

more than one such resonant conducting structure attached to said case, each said structure reflecting a different wavelength within said spectrum.

6. A mine according to claim 1; wherein said resonant structure comprises:

a short-circuited dipole antenna.

7. A mine according to claim 1; wherein said resonant structure comprises:

a coplanar and cross-polarized short-circuited dipole antenna.

8. A mine according to claim 1; wherein said resonant structure comprises:

an open-circuited loop antenna.

9. A mine according to claim 1; wherein said resonant structure comprises:

a short-circuited loop antenna.

10. A mine according to claim 1; wherein said resonant structure comprises:

an axially two dimensional symmetrical short-circuited Y-shaped tripole antenna.

11. A mine according to claim 1; wherein said resonant structure comprises:

an axially three dimensional symmetrical short-circuited quadrapod antenna.

12. A mine according to claim 1; wherein said resonant structure comprises:

a length of flexible electric connection wire.

13. A mine according to claim 1; wherein said resonant structure comprises:

a metal collar mounted on said mine and only three metal wires radiating from said mine, each wire being directly attached at one end to said collar.

14. A mine according to claim 1; wherein said resonant structure comprises:

a patch antenna terminated in an unmatched reflective load.

15. A mine according to claim 14; wherein said load comprises:

an open circuit.

16. A mine according to claim 14; wherein said load comprises:

a short circuit.

17. A mine according to claim 14; wherein said resonant structure further includes:

a section of strip transmission line connected between said patch antenna and said reflective load.

18. A mine according to claim 14; wherein said resonant structure further includes:

a section of coaxial transmission line connected between said patch antenna and said reflective load.

19. A method for utilizing plastic land mines in dry sandy venues; comprising the steps of:

(A) attaching at least one metallic electromagnetic resonator to said mine, which is tuned to a first frequency in a spectrum assigned to radar wavelengths; and (B) burying the mine and resonator below the surface of the sand.

20. The method according to claim 19, further including the following steps performed at a later time;

(C) locating said mine using a Ground Penetrating Radar tuned to said selected frequency;

(D) marking the position of said mine with an identification device and;

(E) neutralizing said mine for its intended purpose.

* * * * *